United States Patent
Sauer

(10) Patent No.: US 7,141,082 B2
(45) Date of Patent: Nov. 28, 2006

(54) GAS GENERATING CELL OR BATTERY AND METHOD OF PRODUCING SAME

(75) Inventor: Hans Sauer, Idstein (DE)

(73) Assignee: GCT Gas-Cell-Tec AG, Herzogenbuchsee (CH)

( * ) Notice: Subject to any disclaimer, the term of this patent is extended or adjusted under 35 U.S.C. 154(b) by 321 days.

(21) Appl. No.: 10/654,993

(22) Filed: Sep. 5, 2003

(65) Prior Publication Data

US 2004/0048153 A1   Mar. 11, 2004

(30) Foreign Application Priority Data

Sep. 7, 2002   (DE) .............................. 102 41 502

(51) Int. Cl.
H01M 6/00   (2006.01)
H01M 2/08   (2006.01)
H01M 4/42   (2006.01)

(52) U.S. Cl. ..................... 29/623.3; 429/175; 429/185; 429/229; 429/174

(58) Field of Classification Search ................ 429/175, 429/185, 27, 229, 174, 181; 29/623.2, 623, 29/623.1
See application file for complete search history.

(56) References Cited

U.S. PATENT DOCUMENTS 6,183,902 B1 *  2/2001  Malay ..................... 429/166

FOREIGN PATENT DOCUMENTS

| DE | 3532335 |  | 11/1989 |
|---|---|---|---|
| DE | 4116359 | A1 | 11/1992 |
| DE | 69801769 | T2 | 7/2002 |
| GB | 1178859 |  | 1/1970 |
| WO | WO 99/63605 |  | 4/1999 |
| WO | WO 00/36685 |  | 12/1999 |

* cited by examiner

*Primary Examiner*—Patrick Joseph Ryan
*Assistant Examiner*—Thomas H. Parsons
(74) *Attorney, Agent, or Firm*—Barnes & Thornburg LLP

(57) ABSTRACT

The present disclosure relates to a gas generating cell including a housing having a cover, an anode cup and a sealing ring. The housing accommodates at least one anode, a cathode and a separator. The cover accommodates at least the cathode and the separator and, with the sealing ring, forms a preassembled unit to be inserted into the anode cup. The present disclosure also relates to a method of producing a gas generating cell, the gas generating cell including a housing having a cover, an anode cup, a sealing ring, and at least one anode, a cathode and a separator. The method steps include: placing at least the cathode and separator into the cover, thereby creating a preassembled unit; and, inserting the preassembled unit and a sealing ring into the anode cup.

13 Claims, 1 Drawing Sheet

GAS GENERATING CELL OR BATTERY AND METHOD OF PRODUCING SAME

BACKGROUND AND SUMMARY

The present disclosure relates to a gas generating cell, and to a method of producing the gas generating cell.

A hydrogen generating cell of the above-mentioned type is known from German Patent Document DE 35 32 335 C2. This hydrogen generating cell has a zinc anode, a hydrogen cathode and an alkaline electrolyte. The cathode consists of a PTFE-bound metal and/or carbon powder layer which is placed into a metallic network as a current conductor and, on the side preferably facing away from the network, contains a porous PTFE foil which is laminated on, for example, rolled on. This cell can be implemented, for example, by using a zinc/air cell of a commercially available construction, in which case, while air and oxygen are excluded, by closing an exterior circuit, a current flow, which generates hydrogen inside the cell, is generated. The hydrogen leaves the cell by an opening in the housing.

This construction creates the need of being able to implement cells which have a higher capacity than the commercially available zinc/air cells.

The present disclosure relates to a gas generating cell including a housing having a cover, an anode cup and a sealing ring. The housing accommodates at least one anode, a cathode and a separator. The cover accommodates at least the cathode and the separator and, with the sealing ring, forms a preassembled unit to be inserted into the anode cup. The present disclosure also relates to a method of producing a gas generating cell, the gas generating cell including a housing having a cover, an anode cup, a sealing ring, and at least one anode, a cathode and a separator. The method steps include: placing at least the cathode and separator into the cover, thereby creating a preassembled unit; and, inserting the preassembled unit and a sealing ring into the anode cup.

The present disclosure makes use of an inverse construction of the gas generating cell to address, among other aspects, for example, a need for cells having higher capacity than known zinc/air cells.

In comparison to the conventional zinc/air cells and the gas generator cells according to the currently existing construction, the gas generating cell of the present disclosure has different aspects. Thus, the cover of the conventional cell is filled with the zinc powder and the electrolyte, for example, is in the form of a zinc gel. The gas electrode is situated in the cup and lies on the cup bottom which, for the exchange of gas in the environment, has a breathing hole. Because of this arrangement, the cover part must be rotated during the mounting of the cell with its liquid content by 180°, which is a measure which is hard to carry out in a clean manner in the ease of cells with a fairly large content. The cup part with the gas electrode element which lies flat on it often presents problems during the operation, particularly when, during the closing of the cell, warping has occurred in the edge area of the electrode.

In contrast, the gas generating cell, according to the present disclosure has a cup, which now operates as the anode part, and which can be filled with the required quantity of zinc and electrolyte, whatever the form. It remains in this position. The cathode element is placed on it and is then closed off.

As a result of the optional sheet metal dome with the breathing hole, which arches over the gas cathode, a gas chamber is created which can be closed off by bonding agents and is disposed in front of the environment of the cell with which the cell corresponds. In this manner, it can be achieved to keep $CO_2$ and other harmful gases away from the interior of the cell and to minimize water losses to the environment.

A collar or flange constructed according to the present disclosure permits a variety of embodiments of apparatuses equipped with these cells, The preassembled cathode unit with the sealing ring is easy to manufacture and dispose and can then be combined with anode cups of varying depths but with a constant diameter, in order to produce cells of a different gas generating capacity. In this manner, batteries (particularly zinc/air cells) as well as gas generating cells (particularly hydrogen generating cells) can be implemented.

Other aspects of the present disclosure will become apparent from the following descriptions when considered in conjunction with the accompanying drawings.

DETAILED DESCRIPTION OF THE DRAWINGS

Figure 1:
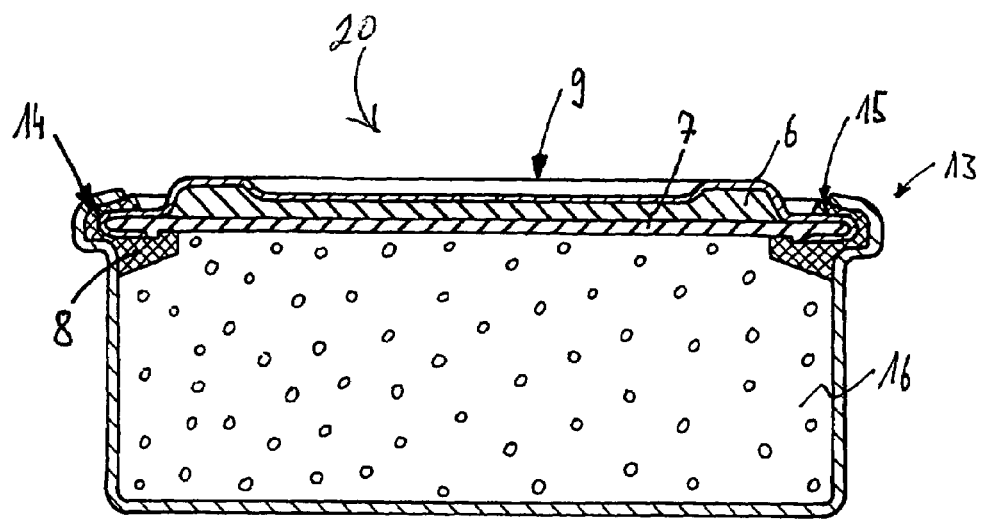
FIG. 1 is a sectional view of a gas generating cell according to the present disclosure.
Figure 2:
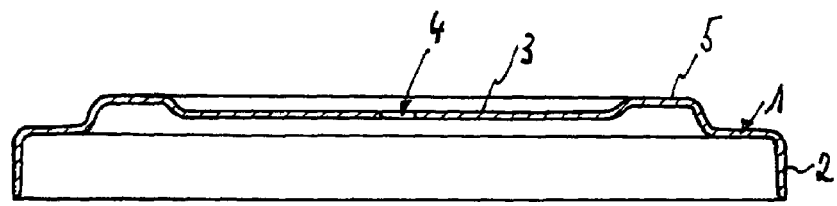
FIG. 2 is a sectional view of the cover before assembly of the cathode unit, according to the present disclosure.

A cover 1, illustrated in FIG. 2, which may be a deep-drawn part made of conductive sheet metal, has a cylindrical section 2 and a bottom 3 closing off section 2 at one of its ends. Around a center point of the bottom 3, a centric hole 4 is constructed which permits exiting of gas from gas generating cell 20 (see FIG. 1). A ring groove 5 is also constructed in the bottom 3.

During assembly of the cell 20, a nickel foam (Ni foam) 6 may be used to cover the bottom 3, including the ring groove 5, and which nickel foam 6 guides gas to the hole 4. A cathode or cathode disk 7 may be adapted to or placed into an inside diameter of the cover 1, and a separate, for example, disk-shaped gas diffusion electrode with a separator coating (not shown here, but see German Patent Document DE 35 32 335 C2) are successively placed into the cover 1.

Figure 3:
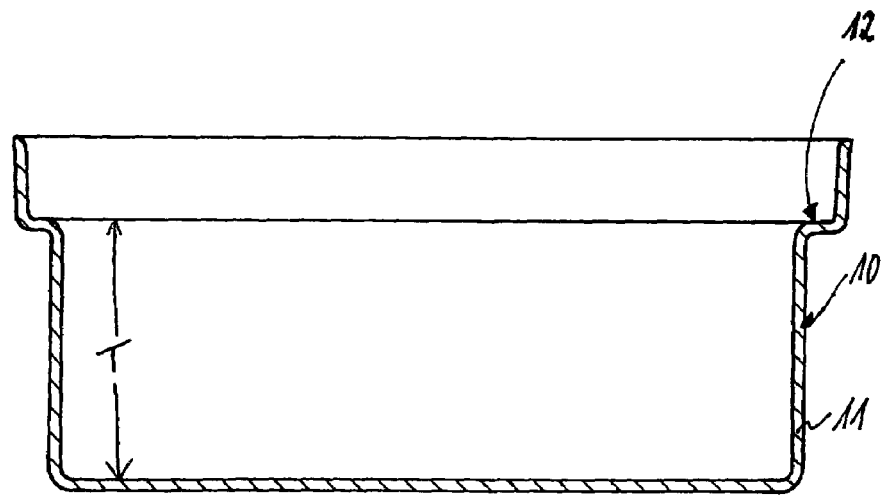
FIG. 3 is a sectional view of the anode cup before assembly, according to the present disclosure.

Then the cylindrical section 2 is shaped or flanged radially toward an interior of an anode cup 10 (see FIG. 3). An insulating or sealing ring 8, which may be made of an insulating material, is pressed over flanged area 14 which sealing ring 8, on its interior side, has a groove 15 for receiving the flanged area or collar 14.

A result of the above assembly is a preassembled cathode unit 9, as shown in FIG. 1.

The anode cup 10 may also be constructed as a deep-drawn part made of conductive sheet metal and can be filled with an anode material 16, such as zinc gel. The anode cup 10 may have a cylindrical jacket 11 of a depth T (see FIG. 3). A ring step 12 is constructed in the cylindrical jacket 11 having a slightly larger inside diameter than an outside diameter of the preassembled cathode unit 9, so that the cathode unit 9 can be fitted from above into the anode cup 10.

After the fitting-in of the cathode unit 9, an edge of the anode cup 10, in an area above the ring step 12, is shaped or flanged toward the interior of the anode cup 10, so that the cathode unit 9 is framed by the anode cup 10.

The preassembled cathode unit 9 can be assembled with anode cups 10 of different depths, so that gas generating cells 20 of many different capacities can be implemented.

The cover 1 and the anode cup 10, together with the sealing ring 8, form a metallic housing 13 of the gas generating cell 20.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

The invention claimed is:

1. A gas generating cell, comprising:
a housing having a cover, an anode cup and a sealing ring, the housing accommodating at least one anode, a cathode and a separator; and
the cover accommodating and securing at least the cathode and separator and, with the sealing ring, forming a preassembled unit to be inserted into the anode cup.

2. The gas generating cell according to claim 1, wherein the cover is constructed as a deep-drawn part made of sheet metal having a cylindrical section and a bottom closing off the cylindrical section at one of its ends, and around a center point of the bottom, a centric hole is constructed, which permits an exiting of gas from the gas generating cell.

3. The gas generating cell according to claim 1, wherein the cover includes a radial flange securing the cathode and separator to the cover, and the sealing ring is pressed over the radial flange, the sealing ring, including a groove for receiving the radial flange.

4. The gas generating cell according to claim 1, wherein the anode cup is constructed as a deep-drawn part made of sheet metal and is filled with an anode material.

5. The gas generating cell of claim 4, wherein the anode material includes zinc gel.

6. The gas generating cell according to claim 1, wherein the anode cup has a cylindrical jacket in which a ring step is constructed which has a slightly larger inside diameter than an outside diameter of the preassembled unit, so that the preassembled unit can be fitted from above into the anode cup.

7. The gas generating cell of claim 6, wherein an edge of the anode cup, in an area above the ring step, is flanged toward an interior of the anode cup so that the preassembled unit is framed by the anode cup.

8. The gas generating cell according to claim 1, wherein nickel foam, which covers a ring groove in a bottom of the cover, guides gas to a hole, and the cathode, having a separator coating and adapted to an inside diameter of the cover, are placed into the cover.

9. The gas generating cell of claim 8, wherein the cathode includes a cathode disk.

10. The gas generating cell of claim 1, wherein at least one such cell comprises a battery.

11. A method of producing a gas generating cell, the gas generating cell including a housing having a cover, an anode cup, a sealing ring, and at least one anode, a cathode and a separator, the method steps comprising:
securing at least the cathode and separator into the cover, thereby forming a preassembled unit; and
inserting the preassembled unit and a sealing ring into the anode cup.

12. The method of claim 11, further including the step of placing nickel foam covering a ring groove in a bottom of the cover.

13. The method of claim 11, further including the step of flanging an edge of the anode cup toward an interior of the anode cup, such that the preassembled unit is framed by the anode cup.

* * * * *